United States Patent
Kawai et al.

(10) Patent No.: US 7,268,772 B2
(45) Date of Patent: Sep. 11, 2007

(54) INFORMATION PROCESSING APPARATUS OPERATING IN TOUCH PANEL MODE AND POINTING DEVICE MODE

(75) Inventors: Jun Kawai, Kawasaki (JP); Youichi Kondou, Kawasaki (JP); Toshiya Miyazaki, Kawasaki (JP); Hideyuki Motoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 10/773,146

(22) Filed: Feb. 9, 2004

(65) Prior Publication Data

US 2004/0196267 A1    Oct. 7, 2004

(30) Foreign Application Priority Data

Apr. 2, 2003    (JP) .............................. 2003-099617

(51) Int. Cl.
*G09G 5/00* (2006.01)

(52) U.S. Cl. .................. 345/173; 345/156; 345/157; 345/158; 345/179; 178/18.01; 178/18.1; 178/19.02

(58) Field of Classification Search ................ 345/156, 345/157, 158, 159, 173, 177, 179, 180, 182; 178/18.01, 18.04, 18.1, 19.02
See application file for complete search history.

(56) References Cited

U.S. PATENT DOCUMENTS

| | | | |
|---|---|---|---|
| 5,757,354 A * | 5/1998 | Kawamura ................. 345/656 |
| 5,782,189 A * | 7/1998 | Hirata et al. .............. 112/102.5 |
| 6,628,271 B1 * | 9/2003 | Matsumoto et al. ........ 345/179 |
| 6,633,280 B1 * | 10/2003 | Matsumoto et al. ........ 345/173 |
| 2003/0046167 A1 * | 3/2003 | Wada .......................... 705/16 |

FOREIGN PATENT DOCUMENTS

| | | |
|---|---|---|
| JP | 6-230888 | 8/1994 |
| JP | 7-072976 | 3/1995 |
| JP | 8-221204 | 8/1996 |

* cited by examiner

Primary Examiner—Bipin Shalwala
Assistant Examiner—Vincent E. Kovalick
(74) Attorney, Agent, or Firm—Staas & Halsey LLP (57) ABSTRACT

An information processing apparatus comprises a display device and a touch panel disposed in front of the display device. The apparatus further comprises: a unit for switching between a touch panel mode of operation and a pointing device mode of operation in accordance with a predetermined condition; a unit for performing processing in response to a touch position pointed to by a user on the touch panel in the touch panel mode of operation; a unit for displaying a symbol indicative of a pointing position on the display device in the pointing device mode of operation, and for moving the symbol at a predetermined reduction scale factor on the display device in accordance with the distance, direction and velocity of the relative movement of the touch position pointed to by the user on the touch panel; and a unit for displaying an image in the neighborhood of the symbol in a magnified form in a predetermined region on the touch panel in the pointing device mode of operation.

14 Claims, 11 Drawing Sheets

INFORMATION PROCESSING APPARATUS OPERATING IN TOUCH PANEL MODE AND POINTING DEVICE MODE

FIELD OF THE INVENTION

The present invention relates to an information processing apparatus with a touch panel, and more particularly to an information processing apparatus with a touch panel having different input modes of operation.

BACKGROUND OF THE INVENTION

In an information processing apparatus having a touch panel and a display, when a user performs an input operation on the touch panel, a position pointed to on the touch panel must be aligned with the position of a corresponding indication on the display. The recent higher definition or resolution display requires a higher resolution touch panel. Such a higher resolution touch panel requires more accurate operation of pointing to an indication of a desired position on the display. However, the pointing operation with a finger produces an inaccurate pointing to the desired position. Thus it is imperative to use a stylus pen with a sharp distal end.

However, even when a stylus pen is used on a higher resolution display of a small-sized terminal, there still is the problem that it is difficult to point accurately to very small buttons and other items on a display screen. On the other hand, when a separate pointing device such as a mouse is used, the volume or size of such a pointing device itself becomes an obstacle to reduce the size of the information processing apparatus.

T. Sasaki in Japanese Patent Publication JP-A-HEI 8-221204 published on Aug. 30, 1996 discloses an apparatus, in which a touch panel is placed over a display, and in which the coordinates of a position pressed on the display are detected, and an indicator on a mouse emulation section, while being held pressed, is moved in any desired direction to input the locus of the movement. Based on the locus of the movement of the indicator, a moving amount calculating means calculates the amount of the movement, while a moving direction calculating means calculates the direction of the movement based on the locus of the movement of the indicator. A moving amount converting means converts the thus calculated amount and direction of the movement on the mouse emulation section into the amount and direction of movement for the cursor to be moved on the display section, thus causing the cursor to move.

O. Fukao in Japanese Patent Publication JP-A-HEI 7-72976 published on Mar. 17, 1995, discloses a system, in which an area for recognizing an operation equivalent to a mouse operation is provided on the periphery of the effective display area of an LCD. When a side region is pointed through a touch panel, the cursor is caused to move accordingly based on whether the side corresponds to the top, bottom, left or right side, and similarly, when the region pointed to is a corner region, one of a plurality of mouse button operations is recognized accordingly based on whether the corner is the upper left, upper right or lower left corner, for processing for that purpose.

H. Noto in Japanese Patent Publication JP-A-HEI 6-230888 published on Aug. 19, 1994 discloses a touch panel for drawing graphics and writing characters, and an information processing apparatus in which a display area, where locus data produced by manipulating and pressing a pen on the touch panel is displayed, can be changed as desired. When a peripheral area of the touch panel is pointed to, the display area moves accordingly.

SUMMARY OF THE INVENTION

In accordance with an aspect of the present invention, an information processing apparatus comprises a display device and a touch panel disposed in front of the display device. The apparatus further comprises: a mode switching unit for switching between a touch panel mode of operation and a pointing device mode of operation in accordance with a predetermined condition; a touch panel processing unit for performing processing in response to a touch position pointed to by a user on the touch panel in the touch panel mode of operation; a pointing processing unit for displaying a symbol indicative of a pointing position on the display device in the pointing device mode of operation, and for moving the symbol at a predetermined reduction scale factor on the display device in accordance with the distance, direction and velocity of the relative movement of the touch position pointed to by the user on the touch panel; and a display magnification processing unit for displaying an image in the neighborhood of the symbol in a magnified form in a predetermined region on the touch panel in the pointing device mode of operation.

In accordance with another aspect of the invention, the information processing apparatus may comprise a touch panel processing unit for displaying a symbol indicating a pointing position on the display device in the touch panel mode of operation so that the position of the symbol is aligned with a touch position pointed to by a user on the touch panel.

The invention also relates to a program for providing such an information processing apparatus.

According to the invention, even in a mobile terminal with a small sized display screen, a touch panel function advantageously allows pointing to a position in higher resolution and a pointing device function advantageously allows operation of positioning in higher resolution.

The invention will be described with reference to the accompanying drawings. Throughout the drawings, similar symbols and numerals indicate similar items and functions.

DESCRIPTION OF THE PREFERRED EMBODIMENTS

The inventors have recognized that, in a small-sized information processing apparatus with a higher resolution display device and a higher resolution touch panel, it will be advantageous to provide a pointing device feature which enables an operation on the touch panel to point to a position in higher resolution.

An object of the present invention is to provide an information processing apparatus having a display and a touch panel, which enables a operation of positioning in higher resolution.

Figure 1:
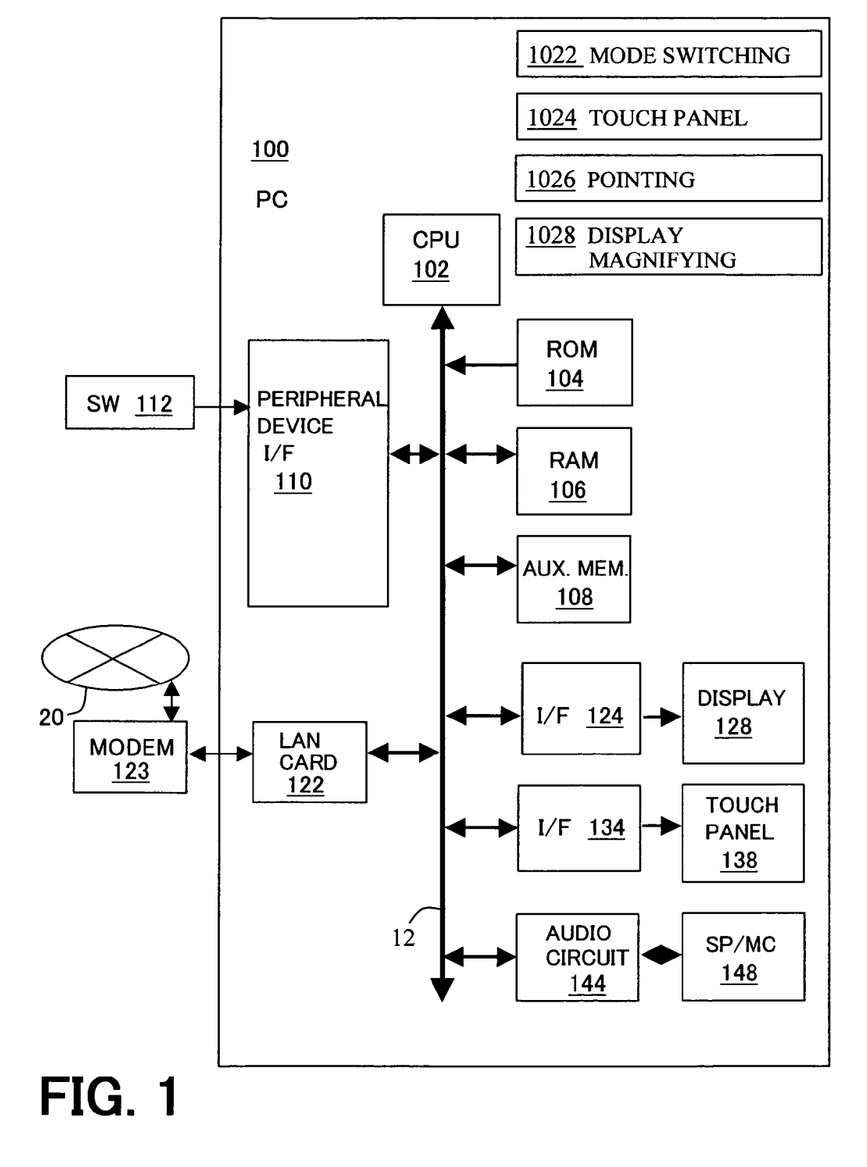
FIG. 1 shows the configuration of a small-sized information processing apparatus having a touch panel and a display device, in accordance with an embodiment of the present invention.

FIG. 1 shows the configuration of a small-sized information processing apparatus 100 having a touch panel and a display device, in accordance with an embodiment of the present invention.

The information processing apparatus 100 includes a CPU 102, a ROM 104, a RAM 106, an auxiliary memory device 108, a peripheral device interface 110 connected to an input device such as a switch 112, a display interface 124, a display device 128, a touch panel interface 134, a transparent touch panel 138, an audio circuit 144, an audio device 148 including a microphone and a speaker, and a LAN card 122 which can be connected to an external network 20 via a modem 123, all of which are interconnected via an internal bus 12.

The CPU 102 performs: a switching operation for switching between a touch panel mode of operation and a pointing device mode of operation, as an input mode of operation, in accordance with predetermined conditions; a touch panel operation in the touch panel mode of operation for processing in accordance with a touch position pointed to by a user on the touch panel; a pointing operation in the pointing device mode of operation for displaying a symbol indicative of a position pointed to on the display and for moving the symbol at a predetermined reduction scale factor on the display device in accordance with the distance, direction and velocity of the relative movement of the touch position pointed to by the user on the touch panel; and a display magnifying operation in the pointing device mode of operation for displaying an image in the neighborhood of the symbol in magnified form in a predetermined region within the touch panel. In the touch panel mode of operation, the CPU 102 may further perform a further touch panel operation for displaying the symbol indicative of the position pointed to on the display so that the indicted position of the symbol is aligned with the position touched by the user on the touch panel. The CPU 10 may include some or all, in the form of hardware, of a mode switching operation section 1022, a touch panel operation section 1024, a pointing operation section 1026 and a display magnifying operation section 1028, which correspond to the operations described above.

Figure 2A:
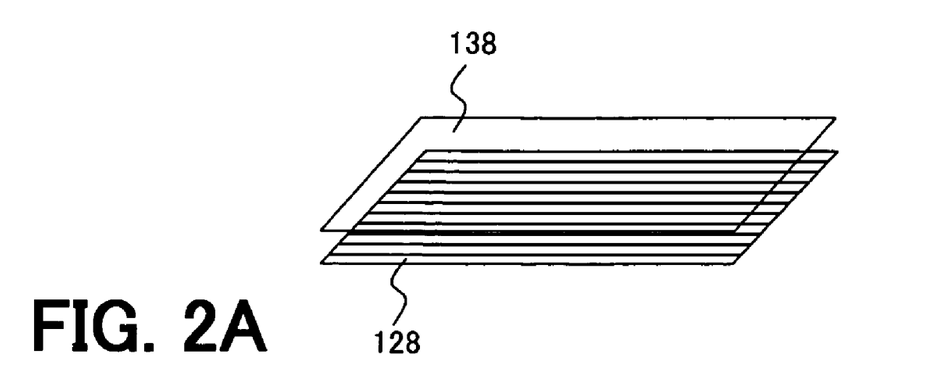
FIGS. 2A and 2B show different arrangements of the display device and the transparent touch panel, which can be employed in embodiments of the invention.
Figure 2B:
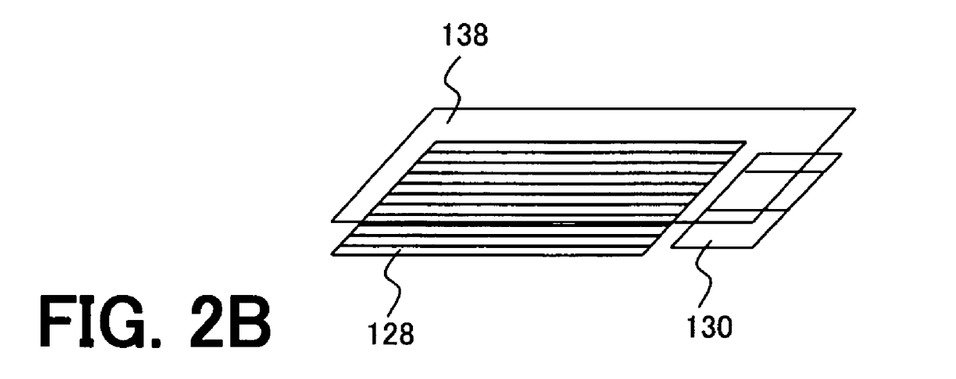

FIGS. 2A and 2B show different arrangements of the display device 128 and the transparent touch panel 138, which can be employed in embodiments of the invention. In FIG. 2A, the touch panel 138 having the same size as the display device 128 is aligned with and overlaid on the display device 128. In FIG. 2B, the touch panel 138 is placed in front of the display device 128 so as to cover the display device 128 and a key area 130 for marking.

The apparatus 100 operates in either the pointing device mode of operation or the touch panel mode of operation in accordance with the position touched by a stylus pen on the touch panel 138, by switching the modes with a hardware or software switch. A finger may be used in stead of the stylus pen. The switching between the two modes can be made by the user. Alternatively, the switching between the two modes may be made automatically in accordance with predetermined conditions.

Figure 3A:
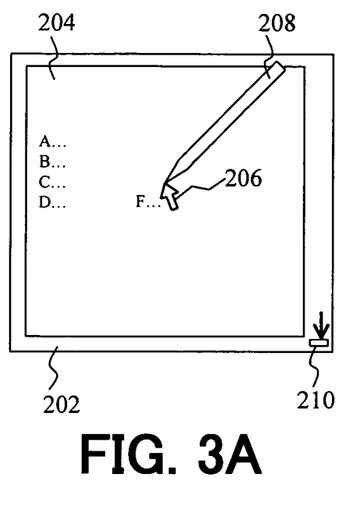
FIGS. 3A and 3B show an embodiment of the information processing apparatus in accordance with the invention.
Figure 3B:
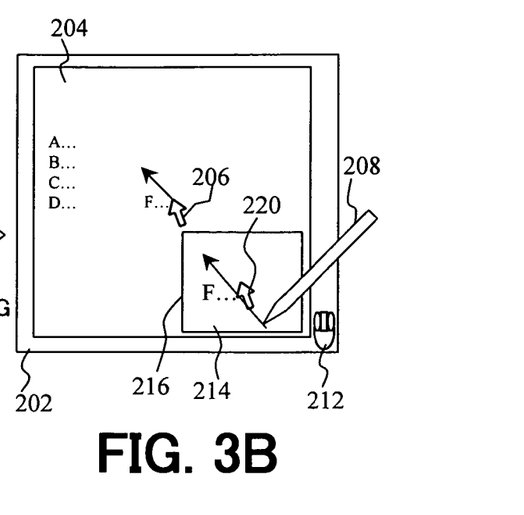

FIGS. 3A and 3B show an embodiment of the information processing apparatus 100 in accordance with the invention.

FIG. 3A shows the indicated position of a cursor or pointer 206 in a form of a mouse arrow pointer as an example on the display device 128, in the touch panel mode of operation. The cursor or pointer 128 includes known cursor or pointer symbols, such as a cross pointer, an I-beam pointer, a link pointer and a grabber hand. A graphic symbol 210 indicates that the apparatus 100 is operating in the touch panel mode of operation. The graphic symbol 210 may not be displayed. While the apparatus 100 is operating in the touch panel mode of operation, when the user manipulates the stylus pen 208 on the touch panel 202 to touch the touch panel 202 at a particular position, the CPU 102 (the touch panel operation section 1024) moves the cursor 206 on the touch panel 202 to the particular position touched with the stylus pen 208, to perform an input operation in accordance with the operation of the stylus pen. However, the cursor 206 may not be displayed in the touch panel mode of operation.

FIG. 3B shows the indicated position of the cursor or pointer 206 on the display device 128 in the pointing device mode of operation. The presence of a pointing area 214 displayed in a predetermined region within a display area 204 indicates that the information processing apparatus 100 is operating in the pointing device mode of operation, while the absence of the area 214 as shown in FIG. 3A indicates that it is operating in the touch panel mode of operation. Further, a graphic symbol 212 mimicking the appearance of a mouse may be displayed to signify that the information processing apparatus 100 is operating in the pointing device mode of operation. A display image within a predetermined range in the neighborhood of the cursor 206 on the touch panel 202 is also displayed in the pointing area 214, in a magnified form at a predetermined magnification scale factor, and the cursor 220 displayed in the area 214 that corresponds to the cursor 206 displayed in the display area 204 always lies at the center of the area 214. While the information processing apparatus 100 is operating in the pointing device mode of operation, when the user manipulates the stylus pen 208 on the touch panel 202 to touch the touch panel 202 at a particular position within the pointing area 214 and move within the area 214, the CPU 102 (the pointing operation section 1026) moves the cursor 206 currently positioned on the touch panel 202, in accordance with the relative movement of the stylus pen 208 held in contact with the touch panel 202, and in the same direction as the pen movement, but at a rate equal to a predetermined reduction scale factor (i.e., at the reciprocal of the magnification scale factor).

The CPU 102 (the switching operation section 1022) may switch between the touch panel mode of operation as shown in FIG. 3A and the pointing device mode of operation as shown in FIG. 3B, in response to tapping the touch panel 202 at the position of the graphic symbol 210 or 212 by the user with the stylus pen 208.

Figure 4A:
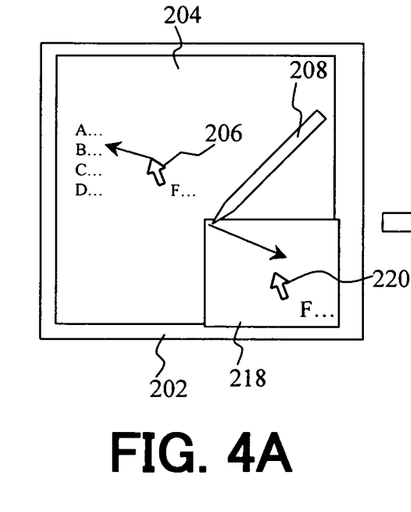
FIGS. 4A and 4B show a further display form in a pointing device mode of operation in FIG. 3B.
Figure 4B:
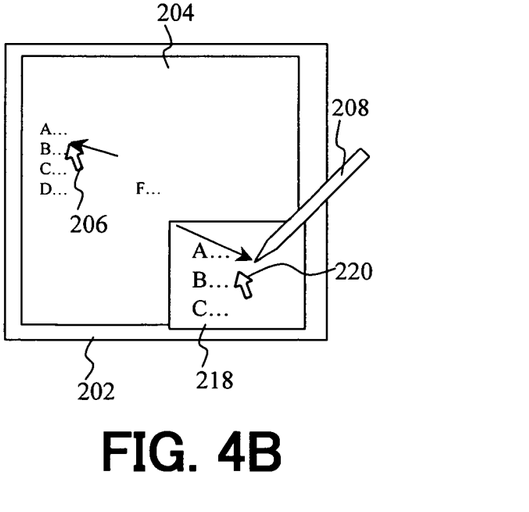

FIGS. 4A and 4B show a further display form in the pointing device mode of operation in FIG. 3B. The image within the predetermined range in the neighborhood of the cursor 206 on the touch panel 202 is also displayed in the pointing area 218, in a magnified form at a predetermined magnification scale factor by the display magnifying operation section 1028, and the cursor 220 displayed in the area 218, which corresponds to the cursor 206 displayed in the display area 204, is always positioned at the center of the area 218. In FIGS. 4A and 4B, when the stylus pen 208 is dragged within the area 218, the cursor 206 moves accordingly, in a direction opposite to the direction of the movement of the stylus pen 208, and at a rate equal to the reciprocal of the magnification scale factor at which the relative movement of the stylus pen 208 is magnified. Thus the cursor 220 in the area 218 does not move, but the display image in the neighborhood of the cursor 220 moves in the same direction as the pen movement. In other words, the cursor 206 moves as if the display image in the neighborhood of the cursor 220 in the magnifying area 218 were grabbed with the stylus pen 208 functioning as a grabber.

Figure 5:
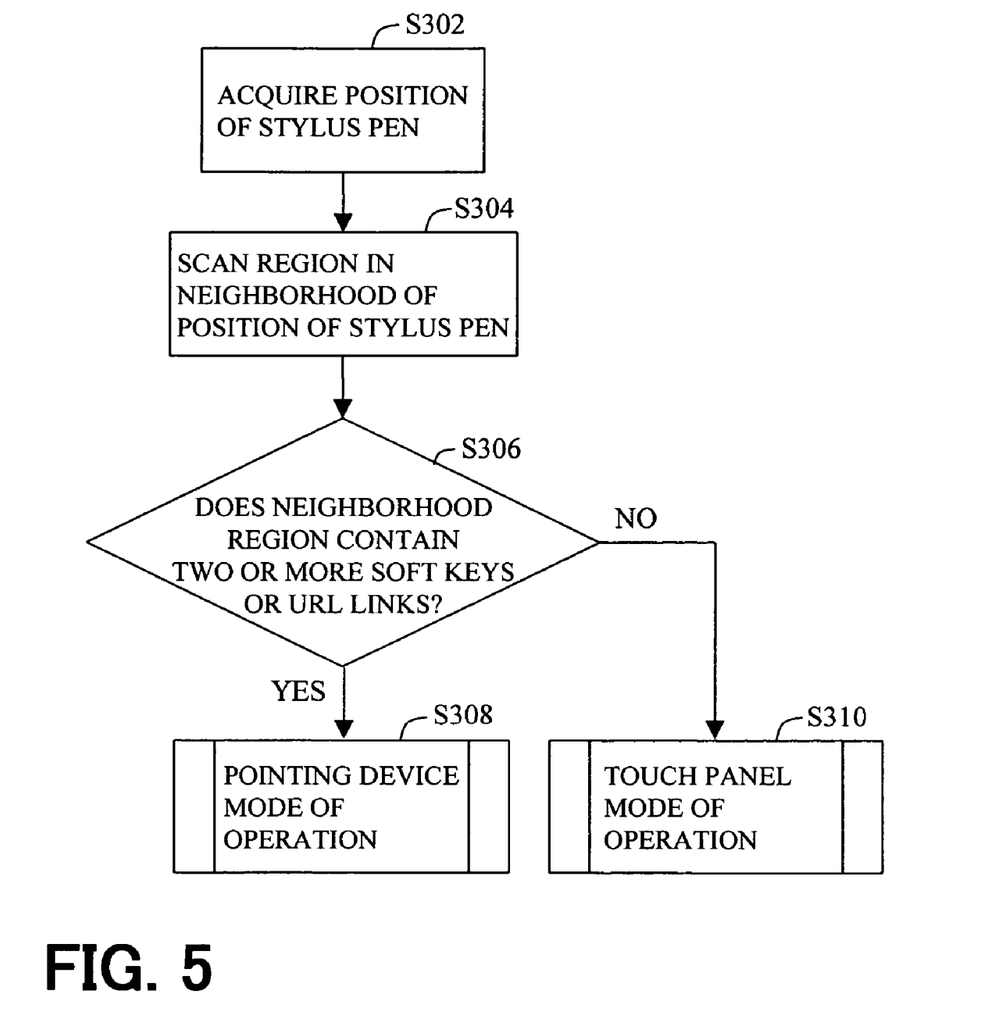
FIG. 5 shows a flow chart for determining whether an input mode of operation should enter into the pointing device mode of operation or the touch panel mode of operation in response to the manipulation of the stylus pen, which is executed by the information processing apparatus in accordance with a program.

FIG. 5 shows a flow chart for determining whether an input mode of operation should enter into the pointing device mode of operation or the touch panel mode of operation in response to the manipulation of the stylus pen 208, which is executed by the information processing apparatus 100, i.e. by the CPU 102 or the mode switching operation section 1022, in accordance with a program.

At Step 302, the CPU 102 (the mode switching operation section 1022) acquires the current position of the stylus pen 208 on the touch panel 138. At Step 304, the CPU 102 (the switching operation section 1022) scans a region within a predetermined range in the neighborhood of the position of the stylus pen 208 on the touch panel 138. At Step 306, the CPU 102 (the switching operation section 1022) determines whether two or more software keys or URL link indications, i.e., clickable objects, are contained within the region. If it is determined that such objects are contained, then the CPU 102 (the switching operation section 1022) at Step 308 causes the input mode of operation to enter into the pointing device mode of operation. This enables the user to move the cursor 206 accurately to the position indicative of a desired key or URL link. If it is determined that two or more software keys, URL links or like objects are not contained in the designated area, the CPU 102 (the switching operation section 1022) at Step 310 causes the input mode of operation to enter into the touch panel mode. This enables the user to instantaneously point to any desired position on the touch panel 138 with the stylus pen 208.

Figure 6:
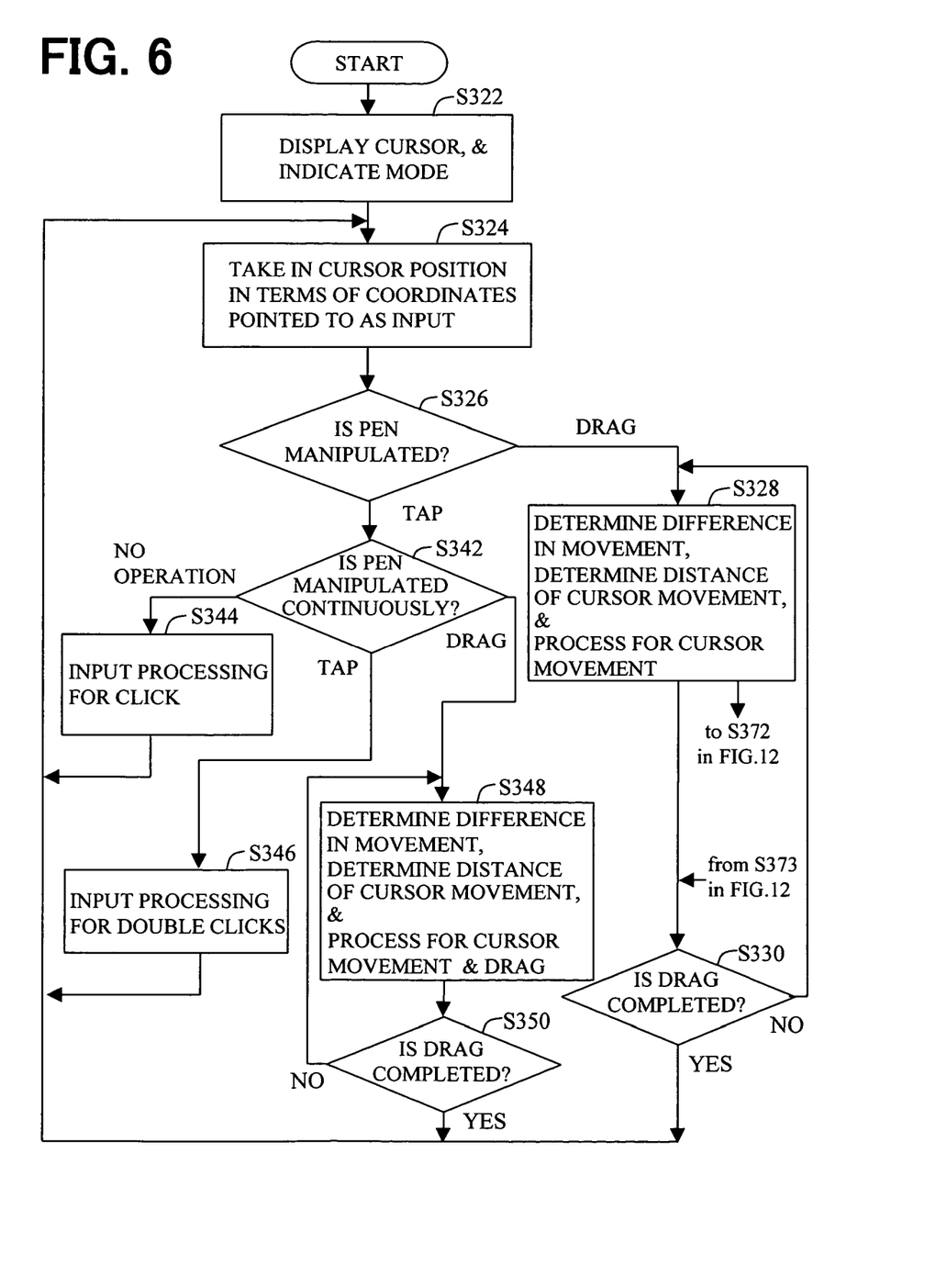
FIG. 6 shows a detailed flow chart illustrating the pointing device mode of operation in FIG. 5.

FIG. 6 shows a detailed flow chart illustrating the pointing device mode of operation at Step 308 in FIG. 5.

At Step 322, the CPU 102 (the display magnifying operation section 1028) displays the cursor 206 on the display device 128, and indicates that the current input mode of operation is the pointing device mode of operation, for example, by displaying the graphic symbol 212 or the area 214.

At Step 324, the CPU 102 (the pointing operation section 1026) takes in the current position of the cursor 206 on the touch panel 138 in terms of coordinates pointed to as an input. At Step 326, the CPU 102 (the pointing operation section 1026) determines whether the stylus pen 208 is manipulated or not, and whether the manipulation represents a drag operation or a tap operation.

If it is determined that a drag operation is performed, the CPU 102 (the pointing operation section 1026) at Step 328 determines the difference between the sets of coordinates representative of the relative movement of the stylus pen 208 on the touch panel 138 caused by the drag operation, determines, in accordance with the difference, a two-dimensional distance (x, y) by which the cursor 206 is to be moved on the touch panel 138 at a predetermined reduction scale factor, and moves the cursor 206 accordingly by that distance. At Step 330, the CPU 102 (the pointing operation section 1026) determines whether the drag operation is completed or not. If it is determined that the drag operation has not yet been completed, and is still continuing, the procedure returns to Step 328. If it is determined that the drag operation is completed, the procedure returns to Step 324.

If, at Step 326, it is determined that a tap operation is performed, the CPU 102 (the pointing operation section 1026) determines at Step 342 whether the stylus pen 208 is subsequently manipulated continuously, and if it is manipulated continuously, then it determines whether the manipulation represents a tap operation or a drag operation.

If it is determined at Step 342 that the stylus pen 208 is not subsequently operated, the CPU 102 (the pointing operation section 1026) at Step 344 determines that the manipulation represents a click operation, and processes it as an input accordingly.

If it is determined at Step 342 that the stylus pen 208 is subsequently manipulated and that the manipulation represents a tap operation, then the CPU 102 (the pointing operation section 1026) at Step 346 determines that the manipulation represents a double click operation, and processes it as an input accordingly.

If it is determined at Step 342 that the stylus pen 208 is subsequently manipulated and that the manipulation represents a drag operation, the CPU 102 (the pointing operation section 1026) at Step 348 determines the difference between the sets of coordinates representative of the relative movement of the stylus pen 208 on the touch panel 138 caused by the drag operation, determines, in accordance with the difference, a two-dimensional distance (x, y) by which the cursor 206 is to be moved on the touch panel 138 at a predetermined reduction scale factor, and moves the cursor 206 accordingly by that distance, to perform the drag operation corresponding to the movement. At Step 350, the CPU 102 (the pointing operation section 1026) determines whether the drag operation is completed or not. If it is determined that the drag operation has not yet been completed, the procedure returns to Step 328. If it is determined that the drag operation is completed, the procedure returns to Step 324.

Figure 7:
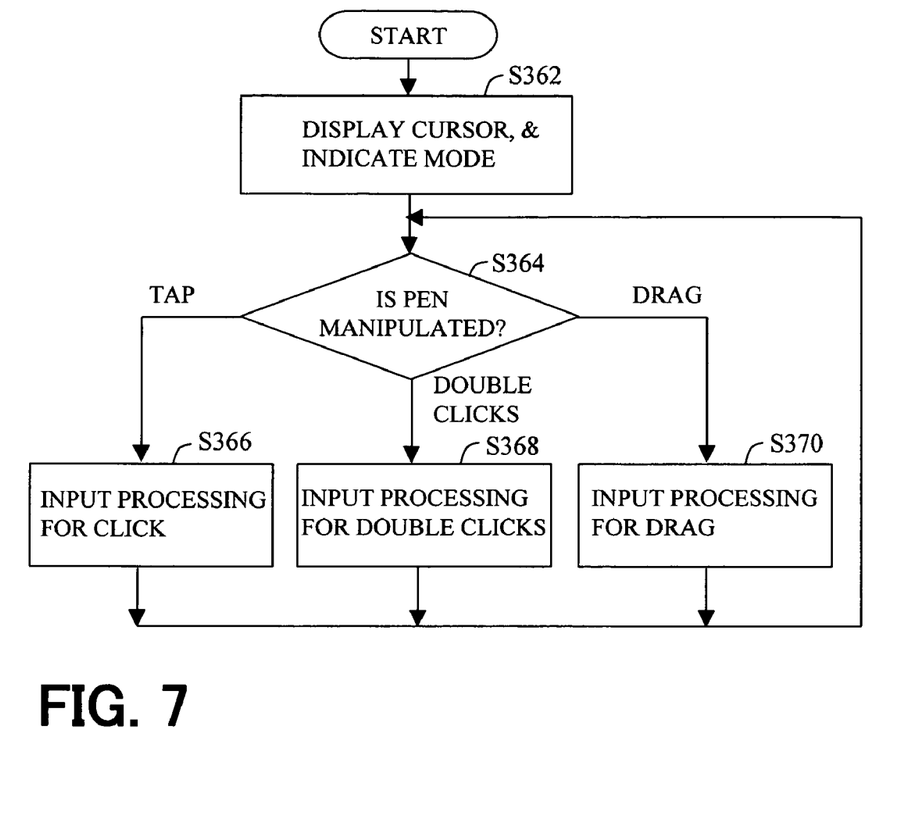
FIG. 7 shows a detailed flow chart illustrating the touch panel mode of operation in FIG. 5.

FIG. 7 shows a detailed flow chart illustrating the touch panel mode of operation at Step 310 in FIG. 5.

At Step 362, the CPU 102 (the touch panel operation section 1024) displays the cursor 206 on the display device 128, and indicates that the current input mode of operation is the touch panel mode of operation, for example, by displaying the graphic symbol 210 or by not displaying the area 214. Alternatively, the cursor 206 may not be displayed.

At Step 364, the CPU 102 (the touch panel operation section 1024) determines whether the stylus pen 208 is manipulated or not, and, if it is manipulated, then it determines whether the manipulation represents a tap operation, a double click operation or a drag operation.

If it is determined at Step 364 that a single tap operation is performed with the stylus pen 208, the CPU 102 (the touch panel operation section 1024) at Step 366 determines the position of the stylus pen 208 as coordinates pointed to and performs input processing for the click operation. After that, the procedure returns to Step 364.

If it is determined at Step 364 that a double tap operation is performed with the stylus pen 208, the CPU 102 (the touch panel operation section 1024) at Step 368 determines the position of the stylus pen 208 as coordinates pointed to and performs input processing for the double click operation. After that, the process returns to Step 364.

If it is determined at Step 364 that a drag operation is performed with the stylus pen 208, the CPU 102 (the pointing operation section 1026) at Step 370 determines the position of the stylus pen 208 as coordinates pointed to and performs input processing for the drag operation. Thus the CPU 102 (the pointing operation section 1026) moves the cursor 206 by a short distance in accordance with the start point coordinate position and the end point coordinate position of the stylus pen 208 in the drag operation on the touch panel 138, to perform the processing accordingly. After that, the procedure returns to Step 364.

Figure 8:
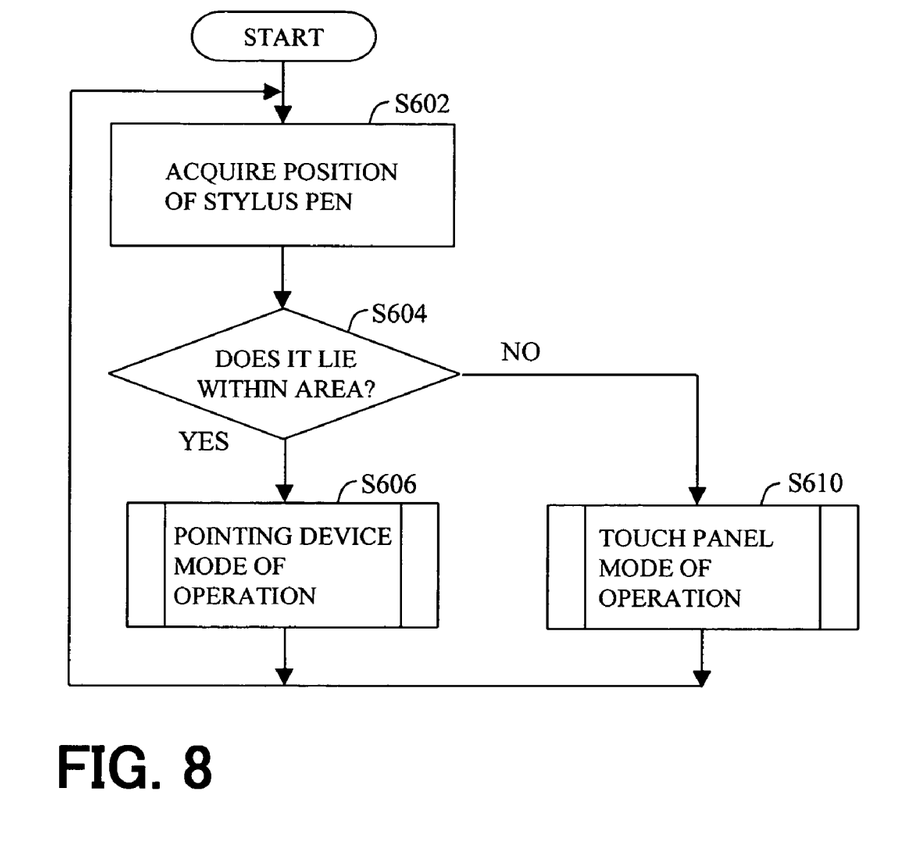
FIG. 8 shows another flow chart for automatically determining whether to operate in the pointing device mode of operation or the touch panel mode of operation in response to the manipulation of the stylus pen, which is executed by the information processing apparatus in accordance with a program.

FIG. 8 shows another flow chart for automatically determining whether to operate in the pointing device-mode of operation or the touch panel mode of operation in response to the manipulation of the stylus pen 208, which is executed by the information processing apparatus 100, i.e. by the CPU 102 or the mode switching processing section 1022, in accordance with a program.

At Step 602, the CPU 102 (the switching operation section 1022) acquires the current position of the stylus pen 208 on the touch panel 138. At Step 604, the CPU 102 (the switching operation section 1022) determines whether the position lies within the area 214. If it is determined that the position lies within the area 214, the procedure proceeds to Step 606 to enter into the pointing device mode of operation in FIG. 6. If it is determined that the position does not lie within the area 214, the procedure proceeds to Step 610 to enter into the touch panel mode of operation in FIG. 7. After Step 606 or 610, the procedure returns to Step 602.

Figure 9:
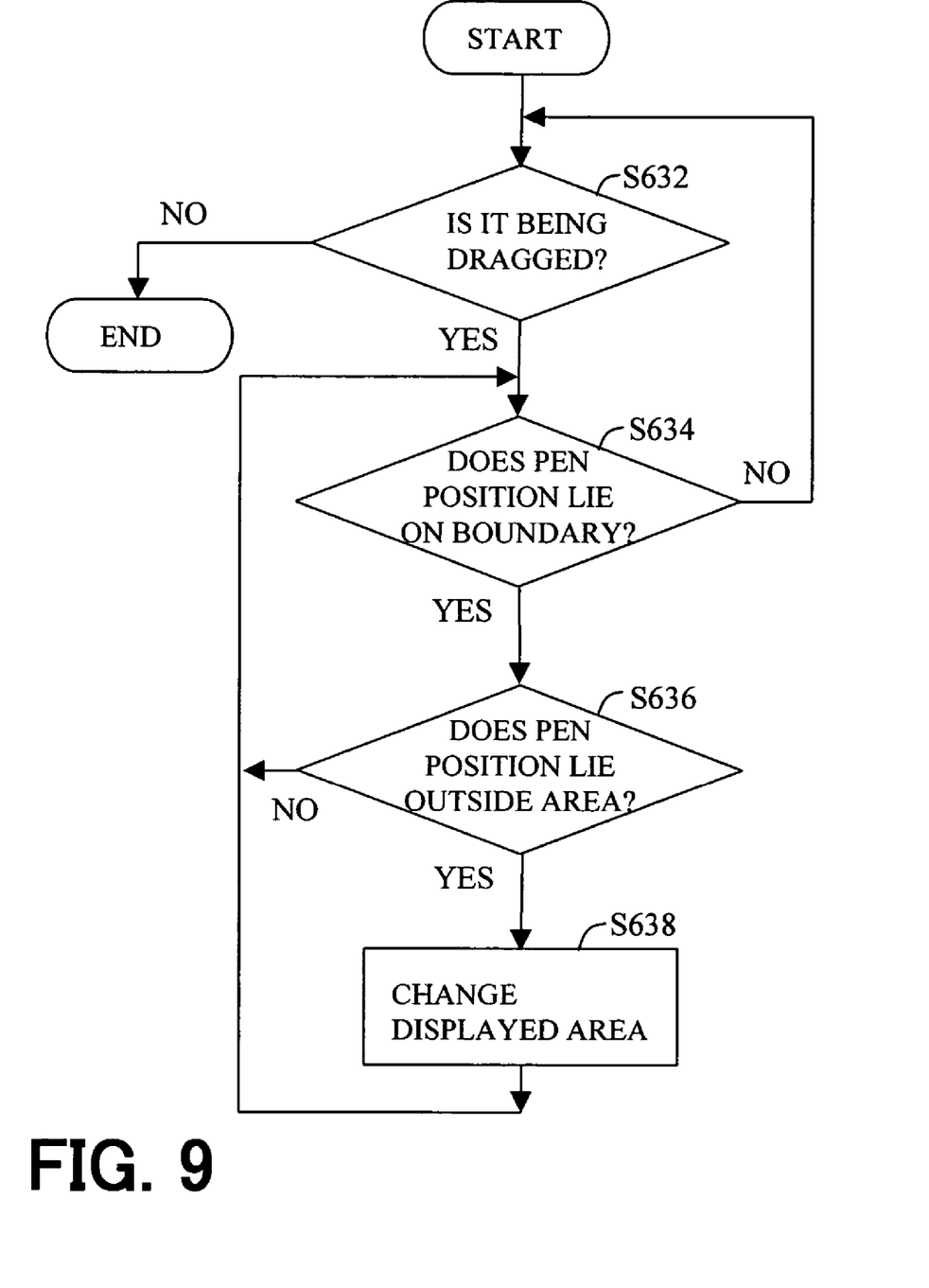
FIG. 9 shows another flow chart which is executed by a CPU, simultaneously with the flow chart of the pointing device mode of operation of FIG. 6 represented by the step in FIG. 5.

FIG. 9 shows another flow chart which is executed by the CPU 102, simultaneously with the flow chart of the pointing device mode of operation of FIG. 6 which is represented by Step 308 in FIG. 5. Alternatively, neither the mode of operation nor the area display may be changed during the drag operation.

At Step 632, the CPU 102 (the pointing operation section 1026) determines whether the stylus pen 208 is currently being dragged or not. If it is determined that the stylus pen 208 is not being dragged, only the Step 308 in FIG. 5 is executed.

If it is determined that the stylus pen 208 is being dragged, then the CPU 102 (the pointing operation section 1026) at Step 634 determines whether or not the current position of the stylus pen 208 lies on a boundary 216 of the area 214. If it is determined that the position does not lie on the boundary 216, the process returns to Step 632.

If it is determined that the position lies on the boundary 216, the CPU 102 (the pointing operation section 1026) determines at Step 636 whether or not the current position of the stylus pen 208 lies outside the area 214. If it is determined that the position does not lie outside the boundary 216, the procedure returns to Step 634.

Figure 11A:
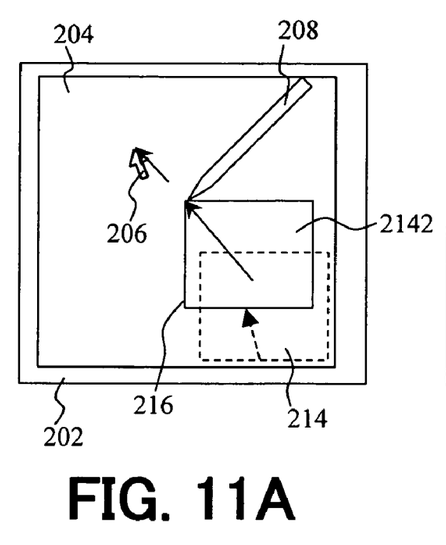
FIGS. 11A and 11B show how an area is moved in accordance with the flow chart of FIG. 9.
Figure 11B:
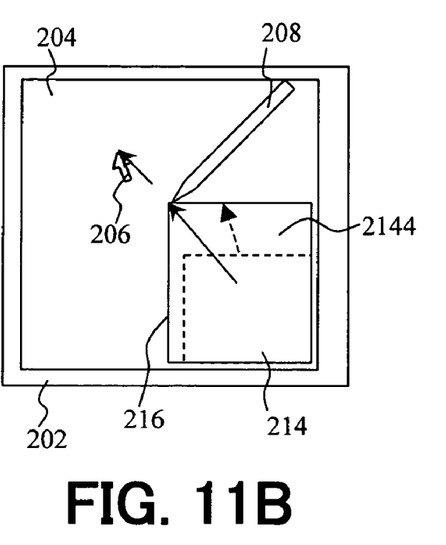

If it is determined that the position lies outside the boundary 216, the CPU 102 (the display magnifying operation section 1028) at Step 638 moves the display position of the area 214 accordingly by a short distance so that the current position of the stylus pen 208 lies on the boundary 216 of the area 214. FIG. 11A shows how the area 214 is moved in accordance with the flow chart of FIG. 9. In FIG. 11A, dashed lines indicate the initial position of the area 214, and solid lines indicate the area 2142 after the movement. Upon completion of the dragging, the area may be moved back to its initial position. Alternatively, the CPU 102 (the display magnifying operation section 1028) may expand the display area 214 in the horizontal and/or vertical direction so that the current position of the stylus pen 208 lies on the boundary 216 of the area 214. Upon completion of the dragging, the size of the area may be reduced to its initial size. FIG. 11B shows how the area 214 is expanded in accordance with the flow chart of FIG. 9. In FIG. 11B, dashed lines indicate the initial position of the area 214, and solid lines indicate the area 2144 after the movement.

Figure 10:
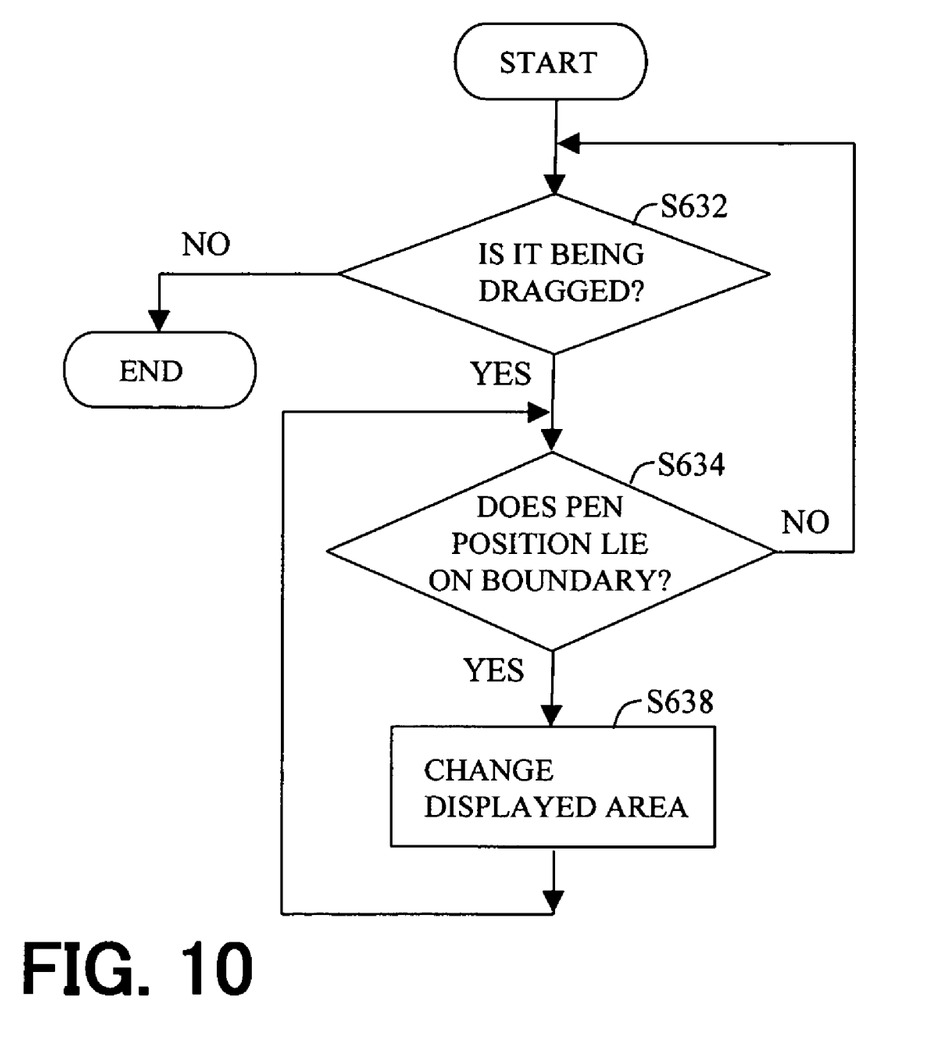
FIG. 10 shows another flow chart which is executed by the CPU, simultaneously with the flow chart of the touch panel mode of operation of FIG. 7 represented by the step in FIG. 5.

FIG. 10 shows another flow chart which is executed by the CPU 102 or the display magnifying operation section 1028, simultaneously with the flow chart of the touch panel mode of operation of FIG. 7 which is represented by Step 310 in FIG. 5.

At Step 632, the CPU 102 (the display magnifying operation section 1028) determines whether the stylus pen 208 is currently being dragged or not. If it is determined that the stylus pen 208 is not being dragged, only the Step 310 in FIG. 5 is executed.

If it is determined that the stylus pen 208 is being dragged, then the CPU 102 (the display magnifying operation section 1028) at Step 634 determines whether or not the current position of the stylus pen 208 lies on the boundary 216 of the area 214. If it is determined that the position does not lie on the boundary 216, the procedure returns to Step 632.

Figure 11C:
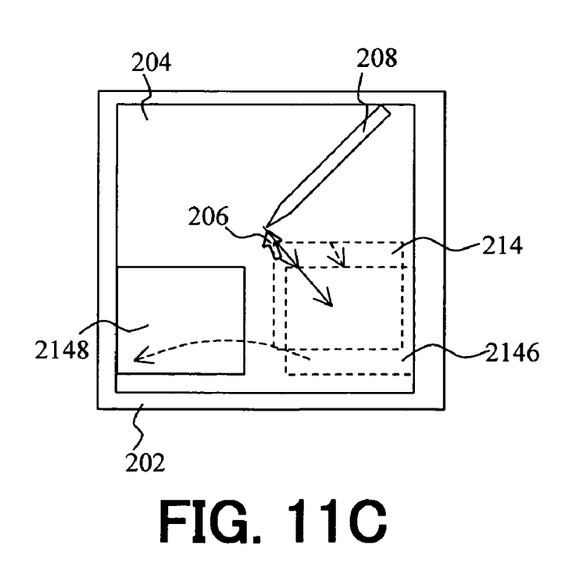
FIG. 11C shows how the area is moved in accordance with the flow chart of FIG. 10.

If it is determined that the stylus pen 208 lies on the boundary 216, the CPU 102 (the display magnifying operation section 1028) at Step 638 moves the display position of the area 214 accordingly by a short distance so that the current position of the stylus pen 208 moves outside the area 214. If the area 214 lies on either one of sides of the display area 204, the area 214 may be cause to move or jump to the opposite side of the display area 204. FIG. 11C shows how the area 214 is moved in accordance with the flow chart of FIG. 10. In FIG. 11C, dashed lines indicate the initial position of the area 214, another set of dashed lines indicates the area 2146 being moved, and solid lines indicate the area 2148 after the movement.

Figure 12:
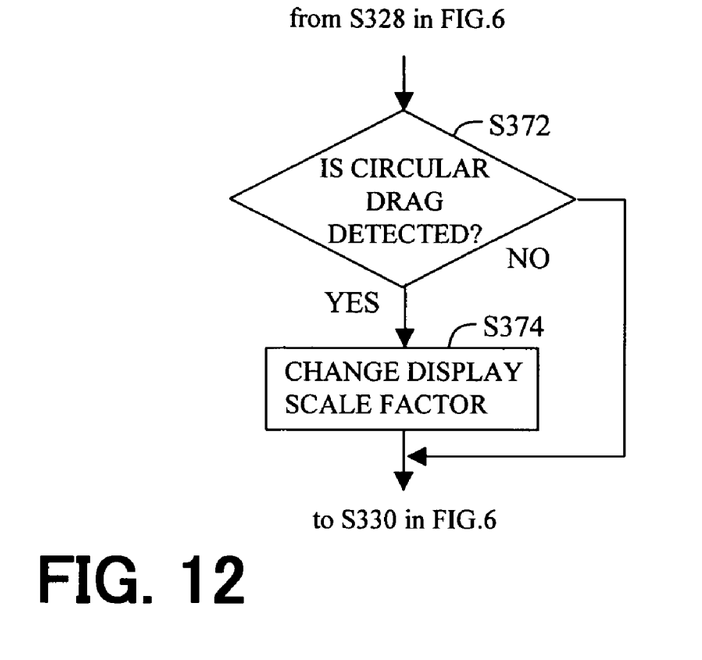
FIG. 12 shows an additional subroutine, incorporated into the flow chart of the pointing device mode of operation of FIG. 6, for changing the magnification scale factor for magnified display within the area, which is executed by the CPU.

FIG. 12 shows an additional subroutine, incorporated into the flow chart of the pointing device mode of operation of FIG. 6, for changing the magnification scale factor for magnified display within the area 214, which is executed by the CPU 102 (the display magnifying operation section 1028).

Figure 13A:
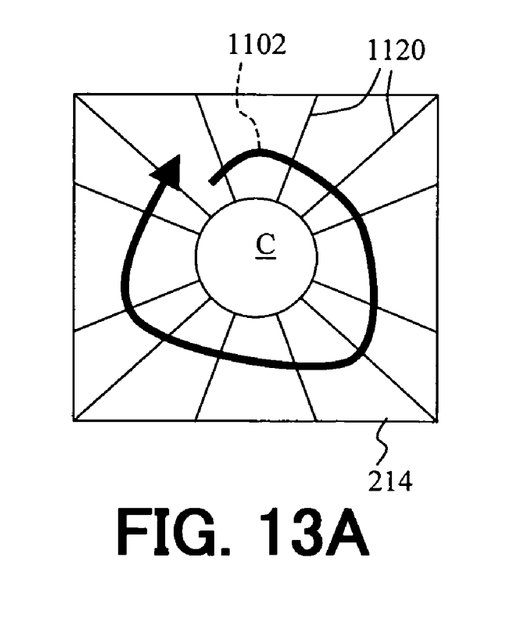
FIGS. 13A and 13B show a circular drag operation in the area 214 in connection with FIG. 12.
Figure 13B:
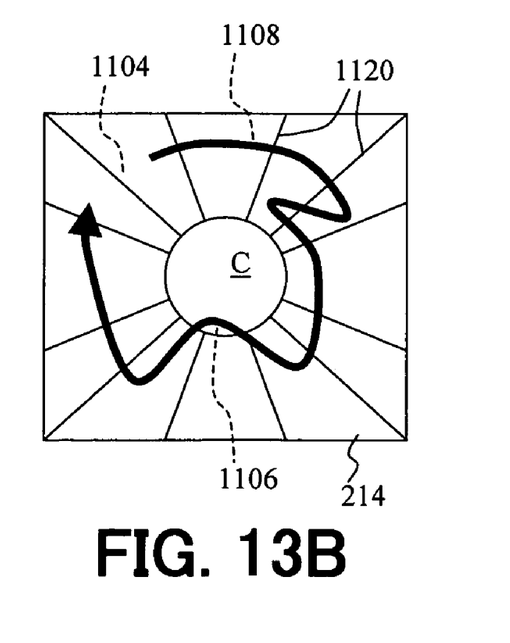

FIGS. 13A and 13B show a circular drag operation in the area 214 in connection with FIG. 12.

After Step 328 in FIG. 6, when the user, at Step 372 of FIG. 12, performs the dragging operation with the stylus pen 208 in such a manner as to draw a circle around a center region C in the area 214 shown in FIG. 13A, the CPU 102 (the pointing operation section 1026) determines whether a circular drag is detected or not, by checking whether the locus 1102 of the stylus pen 208 exhibits a 360 degree rotation in a polar coordinate system with its origin in the center region C and checking whether the locus 1102 crosses the center region C. However, the center region C is not required to be explicitly indicated on the display screen. Whether the locus 1102 of the stylus pen is closed in the polar coordinate system may be determined by detecting whether the locus 1102 of the stylus pen sequentially crosses all of the plurality of lines 1120 extending radially from the center not explicitly shown on the display screen. The plurality of lines 1120 may not explicitly displayed on the screen.

If it is determined that a circular drag is detected, the CPU 102 (the display magnifying operation section 1028) at Step 374 changes the magnification scale factor for displaying. For example, when the locus 1102 exhibits a full rotation in the clockwise direction, the magnification scale factor for displaying may be increased to 1.25 times the current magnification factor. On the other hand, when the locus 1102 exhibits a full rotation in the counterclockwise direction, for example, the magnification scale factor may be reduced to 0.75 times the current magnification factor. After that, the procedure proceeds to Step 330 in FIG. 6.

If it is determined that a circular drag is not detected, the process proceeds to step 330 in FIG. 6.

In FIG. 13B, if the locus 1108 is an incomplete rotation, i.e., if the locus 1108 does not cross all of the radially extending lines 1120 sequentially, or if it crosses the center region C, or if it crosses any one of the radially extending lines 1120 a plurality of times successively, then it is determined that a circular drag is not detected, and the procedure proceeds to Step 330 in FIG. 6.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information processing apparatus, comprising:
   a display device;
   a touch panel disposed in front of said display device; and,
   a controller to control the information processing apparatus according to a process comprising:
      switching between a touch panel mode of operation and a pointing device mode of operation in accordance with a predetermined condition,
      performing processing in response to a touch position pointed to by a user on said touch panel in said touch panel mode of operation,
      displaying a symbol indicative of a pointing position on said display device in said pointing device mode of operation, and for moving said symbol at a predetermined reduction scale factor on said display device in accordance with the distance, direction and velocity of the relative movement of said touch position pointed to by said user on said touch panel, and
      displaying an image in the neighborhood of said symbol in a magnified form in a predetermined region on said touch panel in said pointing device mode of operation.

2. The information processing apparatus as set forth in claim 1, wherein said predetermined reduction scale factor can be changed by said user.

3. The information processing apparatus as set forth in claim 1, wherein when said touch position moves to reach a boundary of said predetermined region, said process further comprises moving the boundary of said predetermined region as said touch position moves, so as to maintain the current mode.

4. The information processing apparatus as set forth in claim 1, wherein said process further comprises establishing said pointing device mode of operation when said touch position lies inside said predetermined region, and establishing said touch panel mode of operation when said touch position lies outside said predetermined region.

5. The information processing apparatus as set forth in claim 1, wherein, when said touch position in said predetermined region exhibits a locus substantially representative of a full circle in a predetermined direction, said process further comprises changing a scale factor of the magnification at which said image in the neighborhood of said symbol is magnified.

6. The information processing apparatus as set forth in claim 1, wherein, when clickable objects, the number of which is larger than a predetermined number, lie within a predetermined range in the neighborhood of the current touch position, said process further comprises operating in said touch panel mode of operation.

7. An information processing apparatus, comprising:
   a display device;
   a touch panel disposed in front of said display device; and
   a controller to control the information processing apparatus according to a process comprising:
      switching between a touch panel mode of operation and a pointing device mode of operation in accordance with a predetermined condition,
      displaying a symbol indicative of a pointing position on said display device in said touch panel mode of operation, so that the position of said symbol is aligned with a touch position pointed to by a user on said touch panel,
      moving, in said pointing device mode of operation, the position of said symbol indicative of said pointing position on said display device in accordance with the distance, direction and velocity of the relative movement of said touch position pointed to by said user on said touch panel, and
      displaying an image in the neighborhood of said symbol in a magnified form in a predetermined region on said touch panel in said pointing device mode of operation.

8. The information processing apparatus as set forth in claim 7, wherein said predetermined reduction scale factor can be changed by said user.

9. The information processing apparatus as set forth in claim 7, wherein when said touch position moves to reach a boundary of said predetermined region, said process further comprises moving the boundary of said predetermined region as said touch position moves, so as to maintain the current mode.

10. The information processing apparatus as set forth in claim 7, wherein said process further comprises establishing said pointing device mode of operation when said touch position lies inside said predetermined region, and establishing said touch panel mode of operation when said touch position lies outside said predetermined region.

11. The information processing apparatus as set forth in claim 7, wherein, when said touch position in said predetermined region exhibits a locus substantially representative of a full circle in a predetermined direction, said process further comprises changing a scale factor of the magnification at which said image in the neighborhood of said symbol is magnified.

12. The information processing apparatus as set forth in claim 7, wherein, when clickable objects, the number of which is larger than a predetermined number, lie within a predetermined range in the neighborhood of the current touch position, said process further comprises operating in said touch panel mode of operation.

13. A computer-readable medium storing a program for an information processing apparatus comprising a display device and a touch panel disposed in front of said display device, said program causing said information processing apparatus to execute:

switching between a touch panel mode of operation and a pointing device mode of operation in accordance with a predetermined condition;

performing processing in response to a touch position pointed to by a user on said touch panel in said touch panel mode of operation;

displaying a symbol indicative of a pointing position on said display device in said pointing device mode of operation, and moving said symbol at a predetermined reduction scale factor on said display device in accordance with the distance, direction and velocity of the relative movement of said touch position pointed to by said user on said touch panel; and displaying an image in the neighborhood of said symbol in a magnified form in a predetermined region on said touch panel in said pointing device mode of operation.

14. A computer-readable medium storing a program for an information processing apparatus comprising a display device and a touch panel disposed in front of said display device, said program causing said information processing apparatus to execute:

switching between a touch panel mode of operation and a pointing device mode of operation in accordance with a predetermined condition;

displaying a symbol indicative of a pointing position on said display device in said touch panel mode of operation so that the position of said symbol is aligned with a touch position pointed to by a user on said touch panel;

moving, in said pointing device mode of operation, the position of said symbol indicating said pointing position on said display device in accordance with the distance, direction and velocity of the relative movement of said touch position pointed to by said user on said touch panel; and displaying an image in the neighborhood of said symbol in a magnified form in a predetermined region on said touch panel in said pointing device mode of operation.

* * * * *

UNITED STATES PATENT AND TRADEMARK OFFICE
CERTIFICATE OF CORRECTION

| | | |
|---|---|---|
| PATENT NO. | : 7,268,772 B2 | Page 1 of 1 |
| APPLICATION NO. | : 10/773146 | |
| DATED | : September 11, 2007 | |
| INVENTOR(S) | : Jun Kawai et al. | |

It is certified that error appears in the above-identified patent and that said Letters Patent is hereby corrected as shown below:

Column 9, Line 50, Claim 1, change "and," to --and--.

Signed and Sealed this

Twenty-ninth Day of April, 2008

JON W. DUDAS
*Director of the United States Patent and Trademark Office*